United States Patent

Doherty et al.

[11] Patent Number: 5,726,718
[45] Date of Patent: Mar. 10, 1998

[54] ERROR DIFFUSION FILTER FOR DMD DISPLAY

[75] Inventors: Donald B. Doherty, Richardson; Vishal Markandey, Dallas; Gregory Pettitt, Rowlett, all of Tex.

[73] Assignee: Texas Instruments Incorporated, Dallas, Tex.

[21] Appl. No.: 315,457

[22] Filed: Sep. 30, 1994

[51] Int. Cl.⁶ .................................................. H04N 5/74
[52] U.S. Cl. ........................... 348/771; 348/607; 359/290; 345/84
[58] Field of Search ............................ 348/771, 770, 348/601, 615, 617; 359/291, 292, 293, 294, 295; 345/84, 85, 138, 148, 149

[56] References Cited

U.S. PATENT DOCUMENTS

| 4,733,230 | 3/1988 | Kurihara et al. | 345/138 |
| 5,201,030 | 4/1993 | Carrie | 345/149 |
| 5,272,471 | 12/1993 | Asada et al. | 345/149 |
| 5,452,024 | 9/1995 | Sampsell | 345/84 |

FOREIGN PATENT DOCUMENTS

| WO 92/09064 | 5/1992 | European Pat. Off. | G09G 3/34 |
| 9209064 | 5/1992 | WIPO | 345/84 |

*Primary Examiner*—Michael H. Lee
*Assistant Examiner*—Nathan J. Flynn
*Attorney, Agent, or Firm*—Robert L. Troike; Leo N. Heiting; Richard L. Donaldson

[57] ABSTRACT

A DMD display system includes an inverse gamma look-up-table (50) for converting raster scanned, gamma corrected video data of 8 bits to 12 bits inverse gamma data with 8 most significant bits (msb) and 4 least significant bits (lsb). The 8 msb are coupled to the micromirror of the DMD display (10) and the four lsb are delayed and halved such that one half of the lsb is added to the next pixel in the horizontal scan and one-half of the lsb is added to the next vertical pixel one line length delayed.

9 Claims, 6 Drawing Sheets

ERROR DIFFUSION FILTER FOR DMD DISPLAY

TECHNICAL FIELD OF THE INVENTION

This invention relates to digital imaging and more particularly to an error diffusion filter for a digital micromirror device (DMD) display.

BACKGROUND OF THE INVENTION

A new projection display that utilizes reflections from hundreds of thousands of micromirrors, each mounted above its own semi conductor memory cell is described in IEEE Spectrum, November 1993, vol. 30, no. 11, written by Jack M. Younse of Texas Instruments Incorporated. The digital micromirror device (DMD) comprises a special light modulator that was invented in 1987 by Larry J. Hornbeck, a Texas Instruments Incorporated scientist. The DMD, or digital micromirror device covers each memory cell of a CMOS static RAM with a movable micromirror. Electrostatic forces based on the data in this cell tilt the mirror either plus or minus 10 degrees, modulating the light incident on the surface. The light reflected from any of the mirrors passes through a projection lens and creates an image on a large screen. Light from the remaining off mirrors is reflected away from the projection lens and trapped. The portion of the time during each video frame that the mirror remains in the on state determines the shades of grey- from black for zero on time to white for 100 percent on time. Color may be added in two ways, by a color wheel or a 3-DMD set up.

Some DMD devices may have the capability to display only a low number of bits representing the on and off times and, therefore, the shades of grey or shades of color, leading to degradation of the video quality. Also, the use of digital degamma in the DMD display systems entails some loss of resolution (blockiness) in the low intensity regions. Finally, even the best of DMDs can have some defects (pixels stuck on, off, or flat). It is desirable to find some method to provide a correction for these display errors and to provide a more pleasing picture without significantly increasing the time for processing by increasing the number of bits for each on or off time.

SUMMARY OF THE INVENTION

In accordance with one preferred embodiment of the present invention, an error diffusion filter for a DMD display comprises means for determining an error between a desired intensity of a first pixel and a closest achievable intensity of a micromirror at said first pixel location and means for propagating that error to neighboring pixels to said first pixel.

DESCRIPTION OF PREFERRED EMBODIMENTS OF THE PRESENT INVENTION

Figure 1:
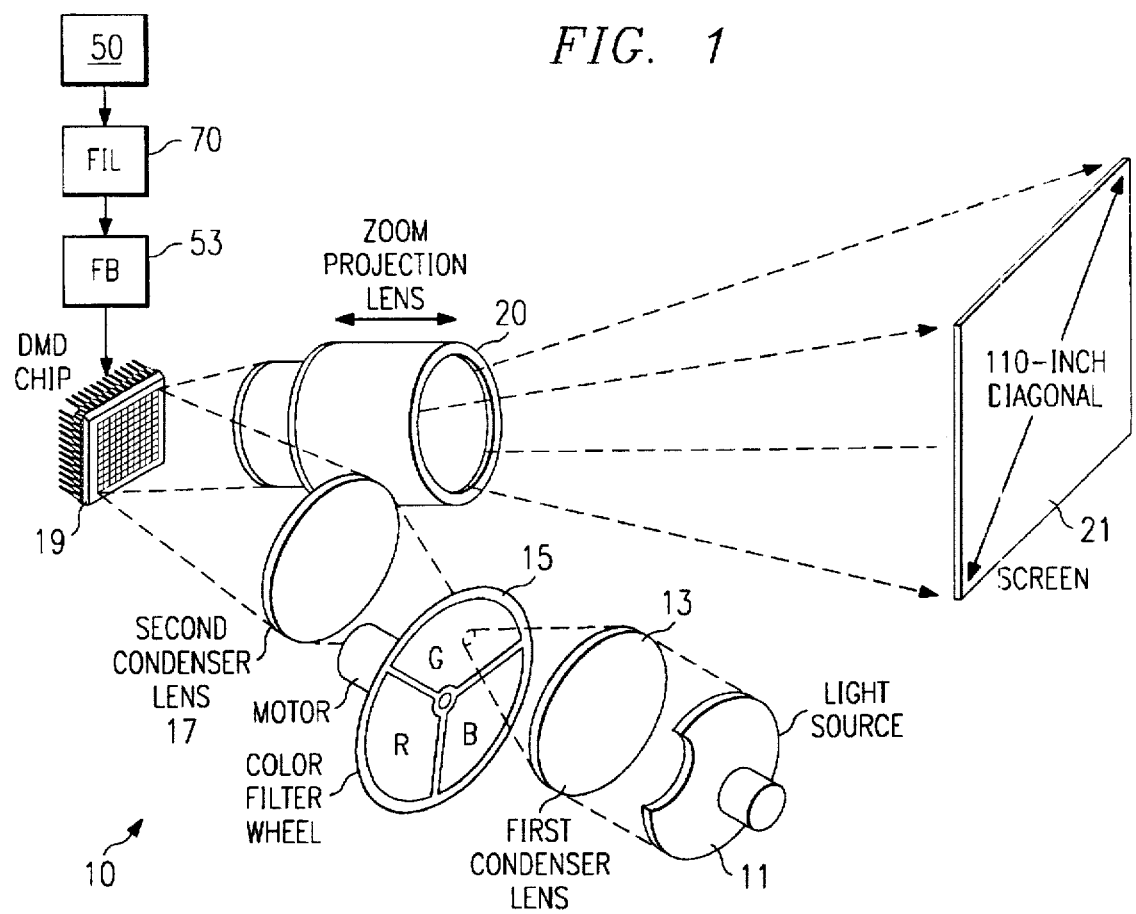
FIG. 1 is an overall block diagram of a Digital Micromirror Display System.
Figure 2:
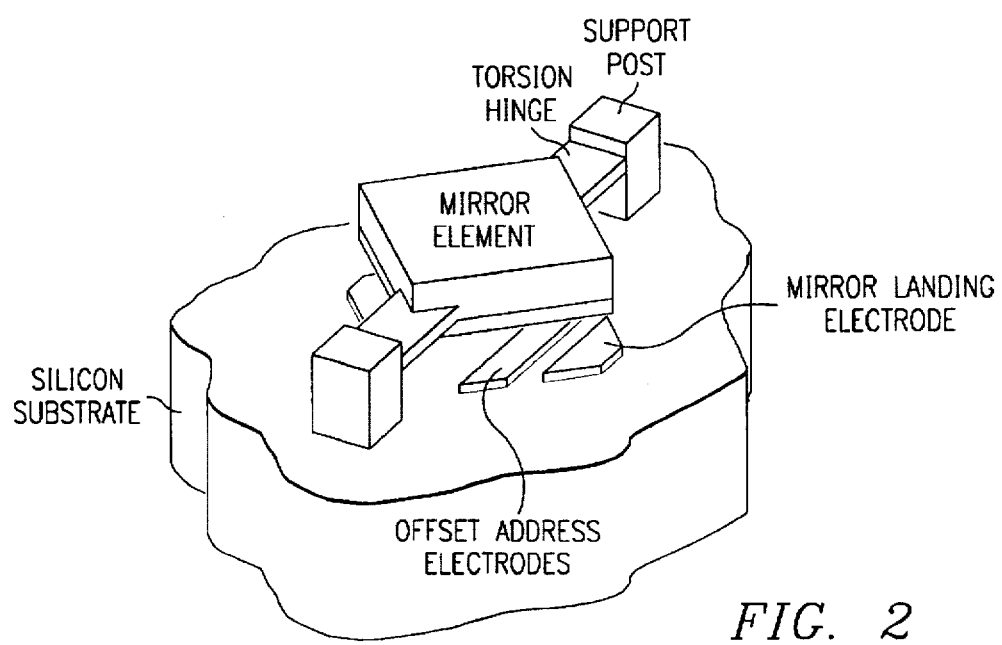
FIG. 2 is a sketch of a micromirror element in FIG. 1.
Figure 3:
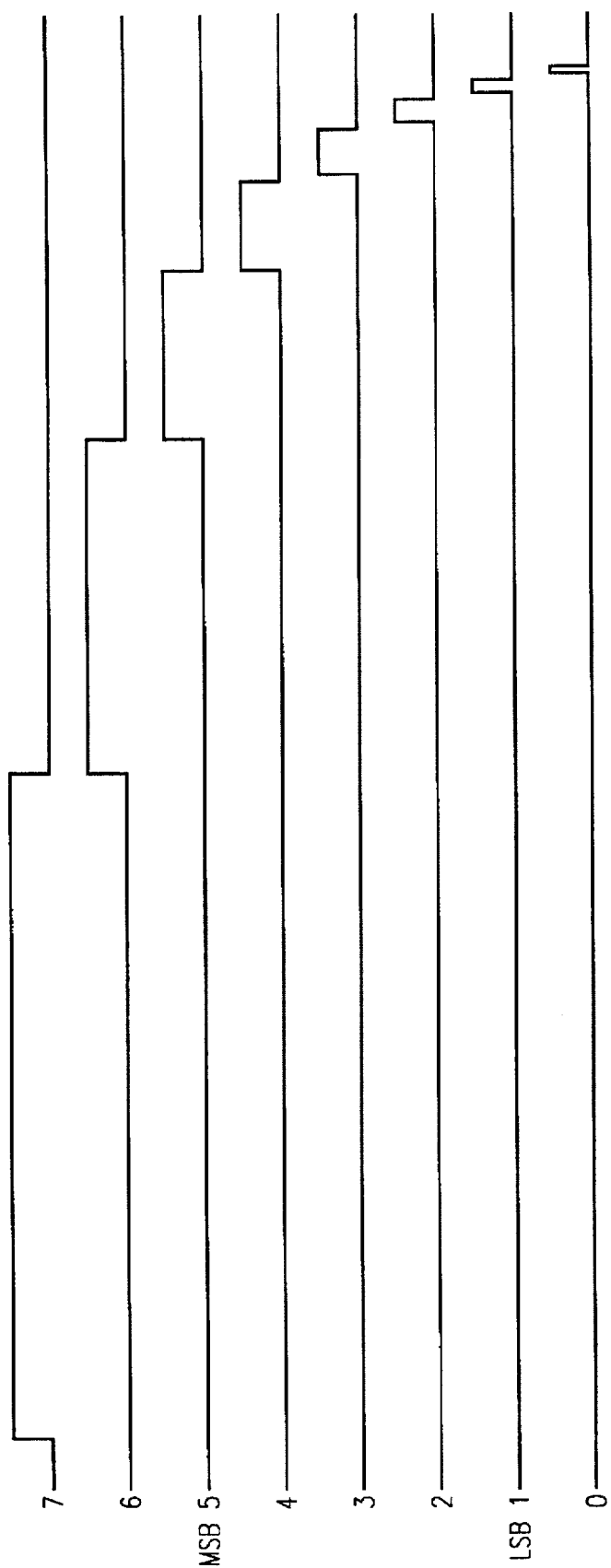
FIG. 3 is a timing diagram illustrating the on-time of MSB and LSB.

Referring to FIG. 1, there is illustrated an overall block diagram of a digital micromirror device (DMD) display system. Referring to FIG. 1, an example of a DMD system 10 is illustrated, wherein the light from a light source 11 is applied through a first condenser lens 13 and through a color wheel 15, which is rotating at about sixty cycles or hertz or 60 frames per second. The light passing through the color wheel 15 passes through a second condenser lens 17 onto a DMD chip 19. The DMD chip includes an array of tiny mirror elements, or micromirrors, where each mirror element is hinged by a torsion hinge and support post above a memory cell of a CMOS static RAM as shown in FIG. 2. The movable micromirror tilts into the on or off states by electrostatic forces based on data in the cell. The tilt of the mirror is either plus 10 degrees (on) or minus 10 degrees (off) to modulate the light that is incident on the surface. For additional details, see U.S. Pat. No. 5,061,049 entitled, "Spatial Light Modulator" and U.S. Pat. No. 5,280,277 entitled, "Field Updated Deformable Mirror Device," both of Larry J. Hornbeck. As shown, the light reflected from any of the mirrors may pass through a projection lens 20 and create images on a large screen 21. As stated previously, the portion of time that a mirror remains in the on state determines the shade of grey. The time duration in which the cell is in the positive direction, or on, is represented by 8 bits of data sent to that cell. The color wheel 15 is divided into red, green, and blue sectors. In the color wheel example, the maximum red would be when the red for example would be reflecting the maximum period of time as when the light is on the longest period of time in the red sector. The same would go for the other two colors. The minimum would be where the micromirror would not be reflecting through the color wheel and the lens, etc. at all during the color cycle. The intensity resolution in this pulse width modulation (PWM) is limited by the response time of the DMD mirrors. The total time available to display a color frame and the least time required to turn a mirror to the "on" state and back to "off" state defines the resolution of present systems. In the arrangement for the 8 bits, the most significant bit, as illustrated in FIG. 3, is the 7th bit with that bit representing the longest "on" time, the 6th bit being then the next longest "on" time, and the 5th bit representing the third longest "on" time, etc., all the way down to the least significant 0 bit, which is represented by the shortest time period. For example, a sequential color DMD system might have 5 (five) msec (milliseconds) available for a color frame. For 8-bit binary PWM, the least significant bit (0 bit on only), the shortest period would be "on" for about 19.6 "Msec" (microseconds). The mirror on/off time would have to be less than 19.6 Msec to implement this scheme with the current method. In a system where the DMD device has the capability of only 6 bits, or even those that have the full eight bits, the system would have too few number of grades of grey or shades of color and therefore tend to show blockiness between portions of the picture. This would represent one of the errors that the present invention is to overcome.

Figure 4:
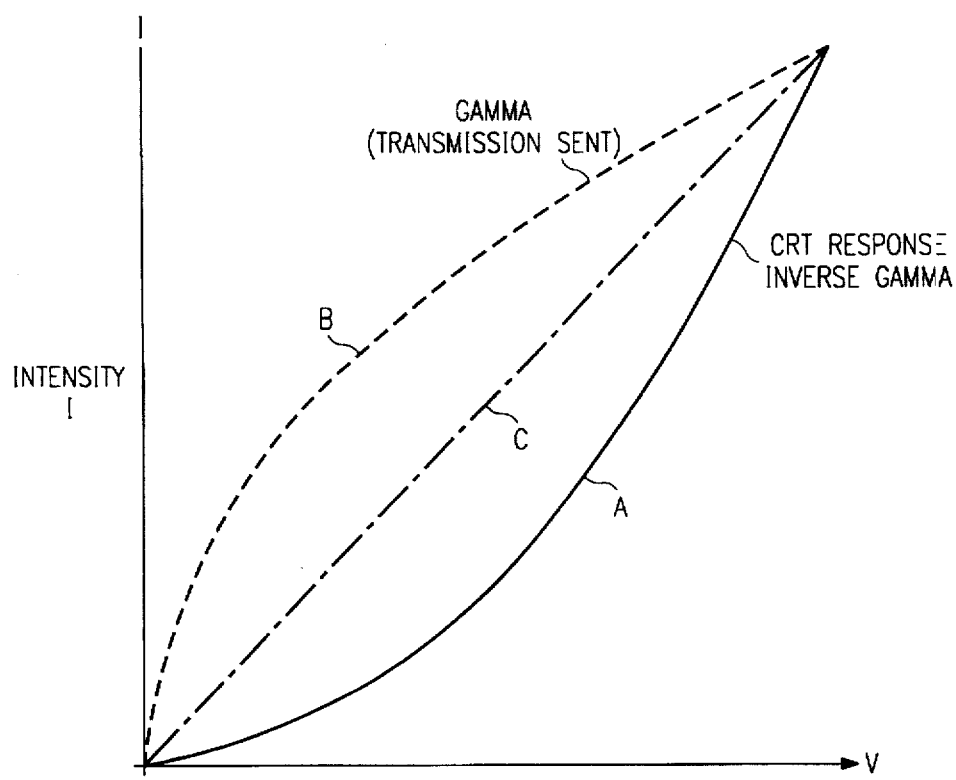
FIG. 4 is a sketch of CRT response, gamma transmission sent, and inverse gamma.
Figure 4A:
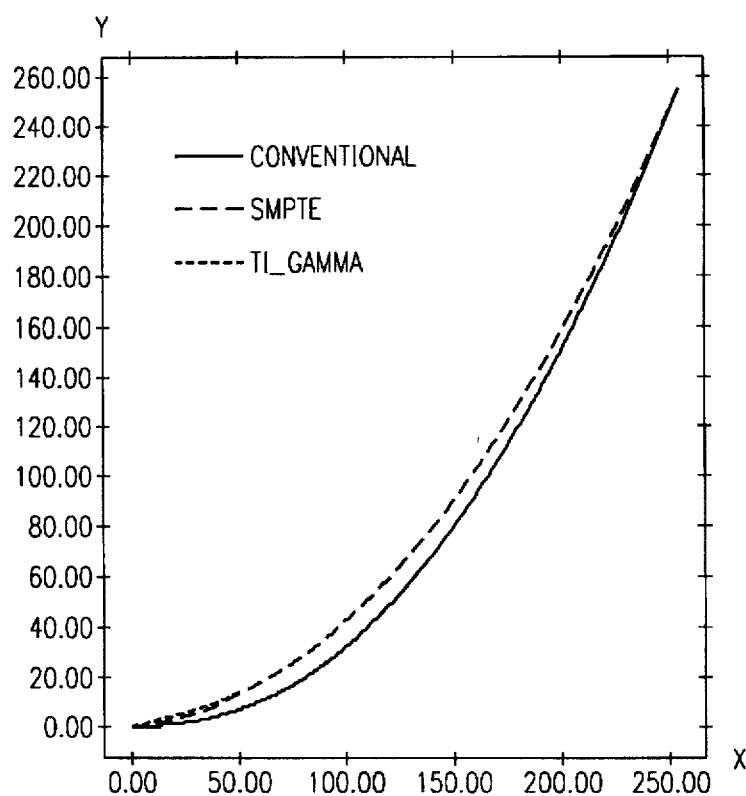
FIG. 4a is a more detailed plot of the degamma for conventional degamma, SMPTE degamma and Texas Instruments' degamma.
Figure 5:
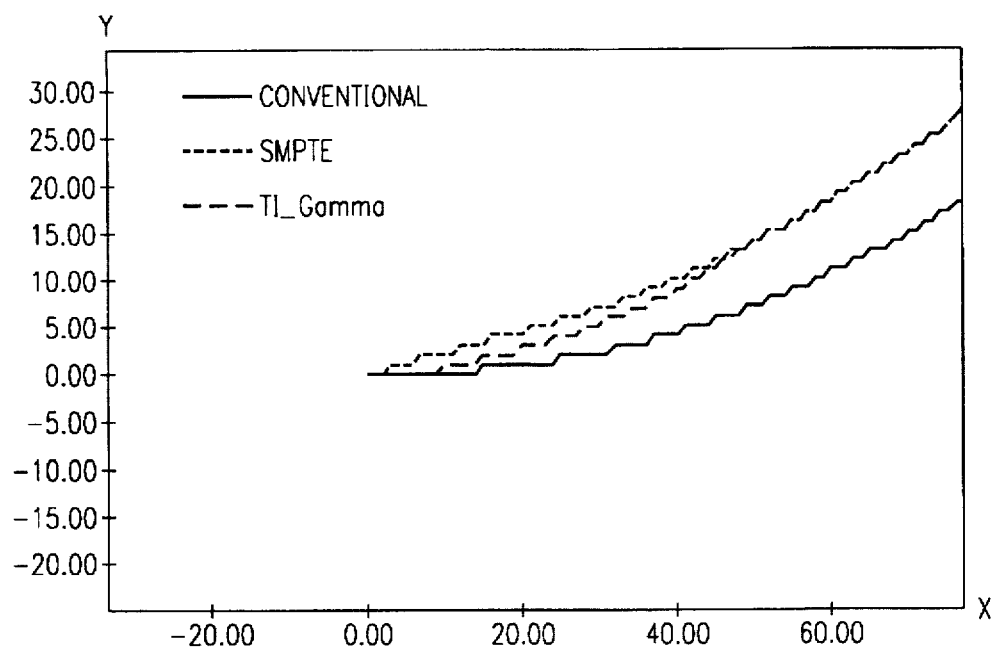
FIG. 5 illustrates the stepped DMD response with lookup table (LUT)

Another error is due to the degamma effect in the display. On a typical CRT television display system, the intensity of the picture is a function of the voltage, which is represented by the CRT response in Curve A of FIG. 4. Note that the intensity for the lower voltage is nearly flat in the low voltage region, but increases rapidly at middle to highest voltage inputs. In order to correct for this, the transmission that is sent to the display has a gamma characteristic of curve B so that the overall response is linear as represented by the linear solid line C. In order to duplicate the CRT response for the digital micromirror device, a digital degamma characteristic is made to follow curve A of FIG. 4. FIG. 4a illustrates conventional degamma, SMPTE degamma, and Texas Instruments' degamma curves. This is done, for example, by each color providing the raster scanned gamma corrected red, green, or blue video data as shown in FIG. 1 using a gamma lookup table (LUT) 50 where for given input threshold levels the mirrors are turned on for given durations. However, due to the gamma LUT 50 being digital in nature the output is stepped as shown in FIG. 5 rather than smooth between the thresholds of the bits and, therefore, the grade levels again take on a blockiness particularly in the low intensity regions.

Figure 6:
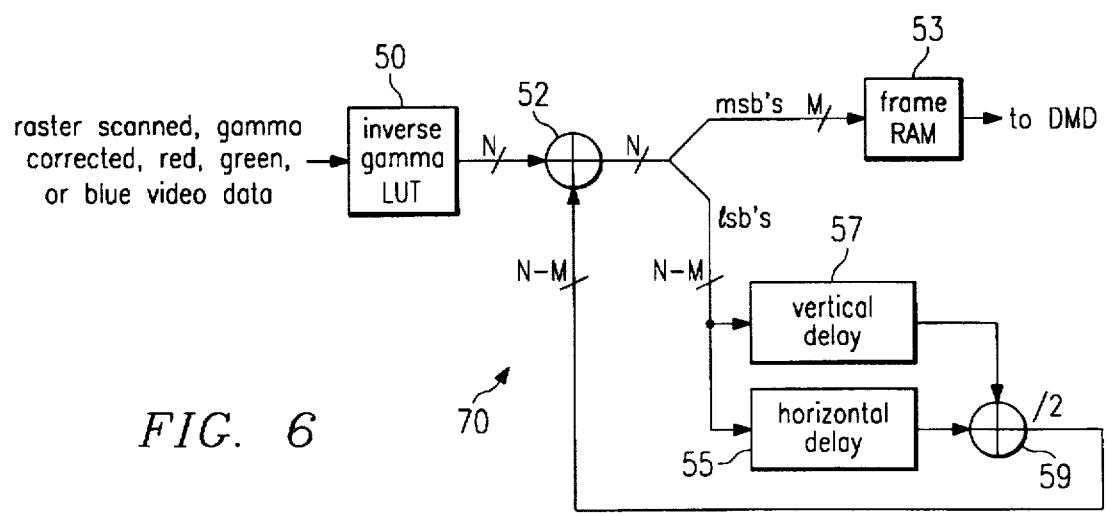
FIG. 6 is a sketch of an error diffusion filter according to one embodiment of the present invention.

In accordance with the present invention, Applicants solve the problems of the low number of bits in the blockiness by an error diffusion filter as shown in FIG. 6 for each color path (red, green, and blue) on the raster scanned video output that would normally be written into the frame RAM buffer 53. The filter 70 computes an error between the desired intensity of a pixel and the immediately lower achievable intensity of the DMD display. This error is then propagated into pixels to the right and below the first pixel as shown in FIG.

Figure 7:
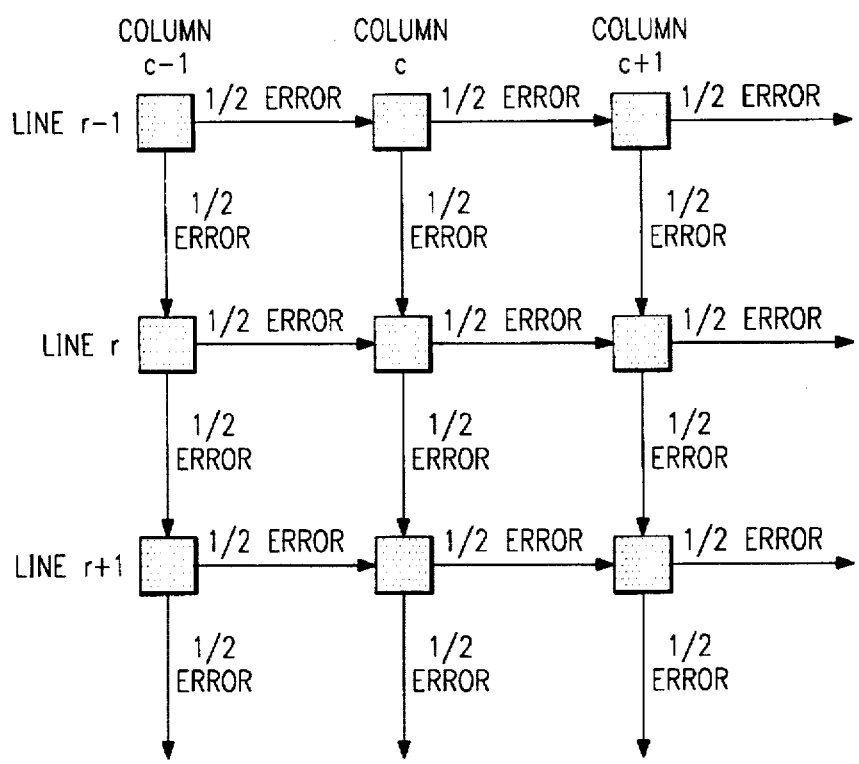
FIG. 7 illustrates the operation of the filter of FIG. 7.

In accordance with one embodiment shown in FIG. 6, the implementation of this filter for one color is illustrated. The desired output for a given color is generated by a degamma lookup table (LUT) 50 at N bits of resolution and combined with errors for earlier pixels. The degamma LUT selected matches the appropriate curve in FIG. 4a. In the embodiment N is 12 bits addressed by 8-bits video data into the LUT 50. The M MSB (most significant bits) are then sent to the DMD frame buffer 53, and DMD display hardware while the N–M LSB (least significant bits) representing error are delayed for combination with later pixels. In this embodiment, M equals 8-bits and N–M=4 lsb (least significant bits). The error is distributed to the right and below using the four lsbs (least significant bits). The horizontal delay element 55 is implemented as a single N–M bit latch, while the vertical delay 57 is accomplished with an L word by N–M bit FIFO (first in first out) memory where L is the number of pixels in a video line. Both delay elements must have appropriate initialization circuitry. The vertical and horizontal error is divided by 2 at divider 59 and summed to the following row and column at summer 52. This filter may be accomplished with a video processor and with memory to accomplish the horizontal and vertical delays. As illustrated in FIG. 7, one-half of the error from the previous row (r-1) is provided to the row r and half of the error from the previous column (c-1) is provided to the next column (c). In this manner the error added enhances the apparent intensity resolution of the video display system.

Figure 8:
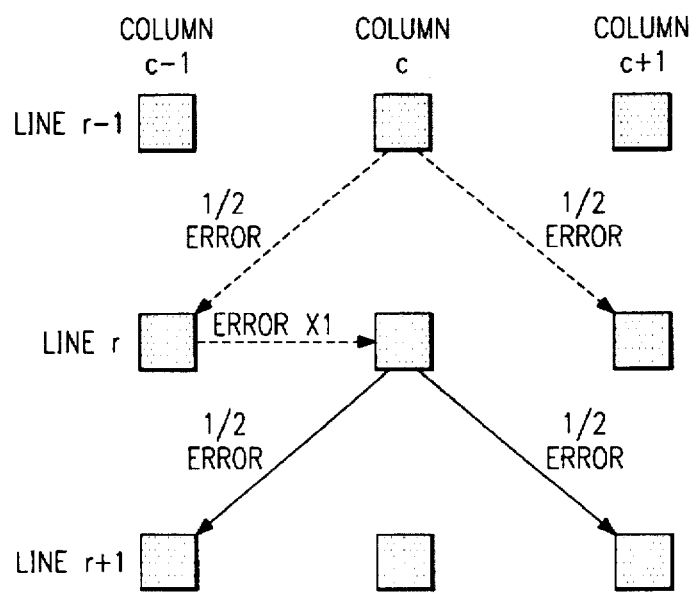
FIG. 8 illustrates the operation in accordance with an improved embodiment where added numbered pixel columns are shifted horizontally, while the errors from even columns are shifted to the next line.
Figure 9:
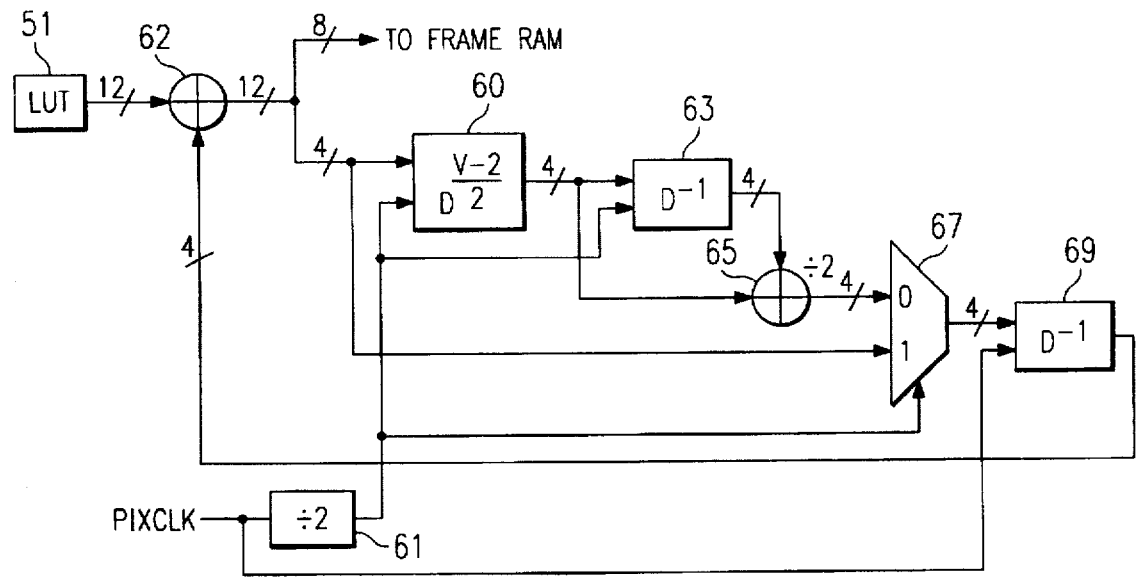
FIG. 9 illustrates a hardware block diagram for the operation of FIG. 9.
Figure 10:
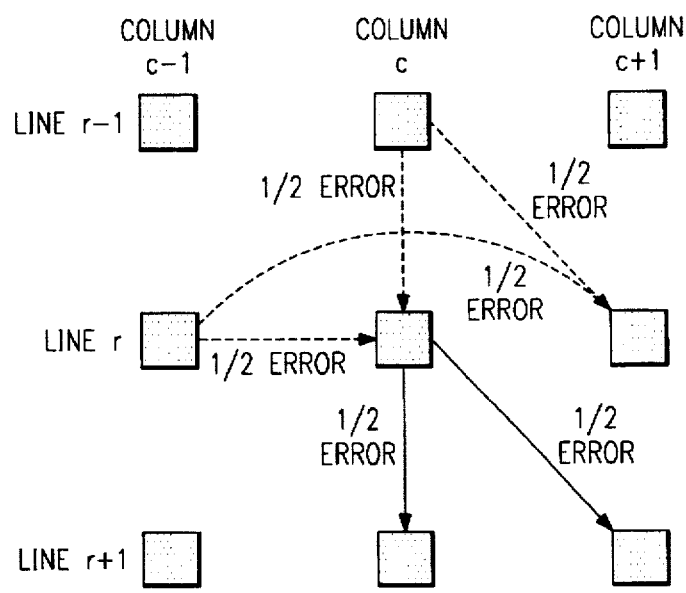
FIG. 10 illustrates the operation of another embodiment using half cycle delay times.

The FIFO memory for a video line described above can add a significant cost to the system, particularly when integrated with multiple functions in custom integrated circuits as might be desirable in high volume applications. In accordance with an improved embodiment of the present invention, only half of the pixels require half the storage that the filter mentioned above requires if the error terms least significant bits (lsbs) are shifted to the next video line from only half of the pixels. One such filter design is illustrated in FIG. 8. The error terms from odd numbered pixel columns are shifted only horizontally, while errors from even columns shift to the next line. As a result, the FIFO vertical delay memory can be reduced to a length of half the number of pixels in a line. FIG. 9 illustrates a hardware block diagram for the filter to achieve the operation of FIG. 8. The pixel clock rate is divided by 2 so that every other error term is written into the vertical delay memory. The 12-bit output from the lookup table 51 is summed at summer 62 with the 4 least significant bits (lsbs) from the error diffusion. The 8 most significant bits (msb) are applied to the frame buffer. The lsbs (4 bits) are applied directly to multiplexer 67 and to delay 60, which are clocked by half the pixel rate by divider 61 to clockout from delay 60 the pixel data two pixels short of a full line delay. The output from delay 60 is applied to delay 63 and summer 65. Delay 63 is also clocked at the half pixel rate to add a two pixel delay to the output from delay 60. The output from each of the delays 60 and 63 is divided into half and applied to the other input of multiplexer 67, which alternately clocks the output from the two inputs at half the clock rate of the picture clock. The output from the multiplexer 67 is delayed one picture element at delay 69 that is clocked by the picture clock. The output from delay 69 is applied as 4 lsbs to summer 62. Another embodiment is illustrated in FIG. 10, wherein error added to a given or next pixel is from the error from the pixel delayed by one line delay and one pixel delay to the given pixel. The delays used are clocked at half the pixel clock rate to again reduce the size of the FIFO.

OTHER EMBODIMENTS

Although the DMD system described uses a color wheel the claimed filter is equally applicable to a three DMD system in place of the color wheel. The degamma lookup table may be different for the three primary colors. Although the present invention and its advantages have been described in detail, it should be understood that various changes, substitutions and alterations can be made herein without departing from the spirit and scope of the invention as defined by the appended claims.

What is claimed is:

1. An error diffusion filter for enhancing the apparent intensity resolution in a DMD Display comprising:

means for determining an intensity error value between a desired high resolution intensity at a first pixel location and closest lower achievable intensity value of a corresponding micromirror at said first pixel location over the entire range of intensities; and means for propagating a fraction of said error value to micromirrors at nearby pixel locations to said first pixel location to thereby enhance the apparent intensity resolution of said DMD display.

2. The filter of claim 1 wherein said fraction of said error value is added to micromirrors at pixel locations to the right and below said first pixel location.

3. The filter of claim 1 wherein one-half of said error value is propagated to the next pixel location to said first pixel location in the horizontal scan and one-half of said error value is propagated to the closest pixel location in the next row to said first pixel location.

4. A DMD display system comprising:

a light source, a DMD device comprising an array of micromirrors mounted above a corresponding plurality of semiconductor memory devices whereupon by operations of the memory devices the mirrors are made to reflect or not reflect light from said light source in a desired direction and the duration of the reflected light at any given mirror indicates pixel intensity at that micromirror location;

a source of raster scan data for operating said micromirrors using said memory devices for a time duration dependent on the data, a degamma lookup table (LUT) responsive to said source of raster scan data for providing a second set of raster scan data with most significant bits representing closest lower achievable intensity level to a desired intensity level and least significant bits representing error level below said desired level; and an error diffusion filter coupled between said lookup table (LUT) and said DMD device comprising:

summing means for summing said most significant bits for a given pixel location with prior least significant bits representing error level below said desired level from a previous pixel location to achieve a pixel intensity with higher resolution than can be displayed by micromirror alone;

means for coupling said most significant bits from said summing means representing the achievable intensity to said DMD device and said least significant bits representing fractional intensity error to delay means; and means for coupling the output of said delay means to said summing means to add said least significant bits representing fractional error to said adjacent pixels; and said delay means delaying said error bits such that said error bits are added to the most significant bits for adjacent pixels.

5. The display system of claim 4 wherein in said error diffusion filter said error bits are delayed by a horizontal delay and halved such that one-half of said error bit value is delayed and added to the next pixel and delayed by a vertical delay and halved such that one-half of said error bit value is delayed one line and added to the next vertical pixel.

6. The display of claim 4 wherein said vertical delay is a FIFO memory with a length equal to the number of video pixels in a line.

7. An error diffusion filter for enhancing the apparent intensity resolution in a DMD display comprising:

means for determining intensity error values between desired intensity levels a first pixel locations and an immediately lower achievable intensity level of a micromirror at said first pixel locations over the entire range of intensities; and means including a vertical delay memory for propagating said intensity error values to the next video line from only half of the pixel locations.

8. The filter of claim 7 wherein the error values from odd numbered pixel columns are shifted only horizontally by a horizontal delay memory while error values from even columns are shifted to the next line via said vertical delay memory.

9. The filter of claim 8 wherein the pixel clock rate is divided in half so every other error value is written into the vertical delay memory.

* * * * *